United States Patent
Romero Magariño et al.

(10) Patent No.: US 6,453,522 B1
(45) Date of Patent: Sep. 24, 2002

(54) SYSTEM FOR FIXING ACCESSORIES TO PANELS AND/OR SELF-CARRIER ELEMENTS FOR THE INTERNAL LINING VEHICLES

(75) Inventors: Antonio Romero Magariño, Burgos; Jesús Tomé Pérez, Bilbao, both of (ES)

(73) Assignee: Irausa Ingenieria, S.A., Burgos (ES)

( * ) Notice: Subject to any disclaimer, the term of this patent is extended or adjusted under 35 U.S.C. 154(b) by 0 days.

(21) Appl. No.: 09/202,354

(22) PCT Filed: Apr. 21, 1998

(86) PCT No.: PCT/ES98/00105
§ 371 (c)(1),
(2), (4) Date: Dec. 14, 1998

(87) PCT Pub. No.: WO98/48179
PCT Pub. Date: Oct. 29, 1998

(30) Foreign Application Priority Data

| Apr. 22, 1997 | (ES) | ................................................ 9700865 |
| Oct. 28, 1997 | (ES) | ................................................ 9702231 |
| Apr. 1, 1998 | (ES) | ................................................ 9800689 |

(51) Int. Cl.[7] .................... A44B 17/00; A44B 21/00; B60R 7/10
(52) U.S. Cl. .................... 24/458; 24/289; 24/293; 24/295
(58) Field of Search .................... 24/458, 289, 293, 24/295, 297

(56) References Cited

U.S. PATENT DOCUMENTS

| 2,616,142 A | * | 11/1952 | Tinnerman .................... 24/458 |
| 3,374,979 A | | 3/1968 | Russell et al. ............... 248/223 |
| 4,506,419 A | * | 3/1985 | Mitomi ........................ 24/289 |
| 4,575,060 A | | 3/1986 | Kitagawa ...................... 269/43 |
| 4,630,338 A | * | 12/1986 | Osterland et al. .............. 24/295 |
| 5,186,517 A | * | 2/1993 | Gilmore et al. ................ 24/295 |
| 5,533,237 A | | 7/1996 | Higgins ........................ 24/289 |
| 5,636,891 A | * | 6/1997 | Van Order et al. ........... 24/295 |

FOREIGN PATENT DOCUMENTS

| DE | 3517121 | | 7/1986 | |
| EP | 0743461 | | 11/1996 | |
| GB | 0862667 | * | 3/1961 | .................. 24/295 |
| WO | 0248591 | | 12/1987 | |

* cited by examiner

Primary Examiner—Victor Sakran
(74) Attorney, Agent, or Firm—Ladas & Parry

(57) ABSTRACT

The fixing system comprises a clip (1) and a peg (15) previously fixed to the respective accessory (13) which is to be attached to the clip (1) to define an integral assembly that is fixable to the respective self-supporting panel or element. The clip (1) has a window (14) on its base, allowing a peg (15) through, the peg being fixed by means of the facing top edges (11) in which the sides (8) of the actual clip (1) end, the foregoing in order that, by inserting and clipping the peg (15) through the clip (1), the integral clip-peg-accessory assembly may be fix onto the respective bodywork vehicle directly, without anchorage screws being required. Dismounting can be easily made by means of a suitable implement which is driven to turn and separate the top edges (11), allowing the clip to be rendered independent from the peg, and hence the assembly to be dismounted.

16 Claims, 13 Drawing Sheets

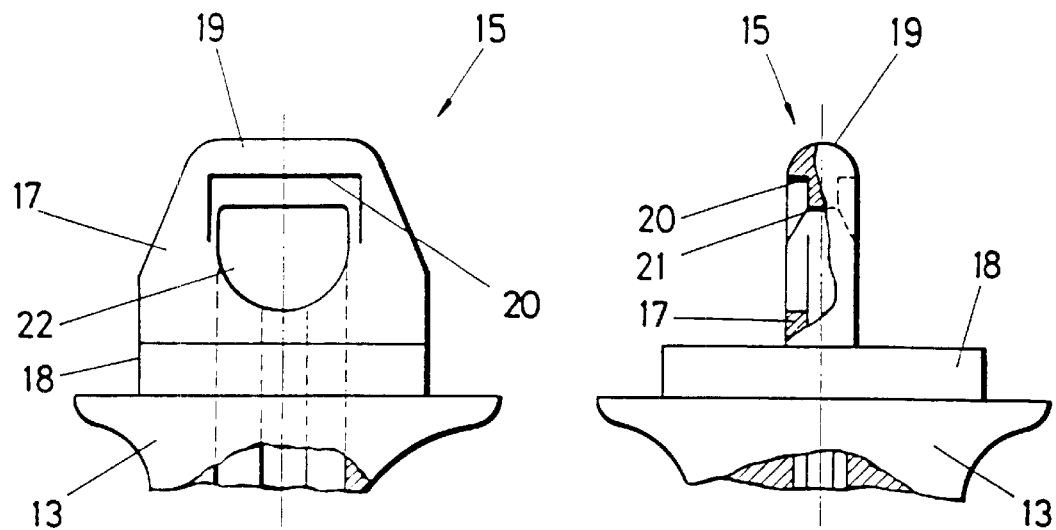
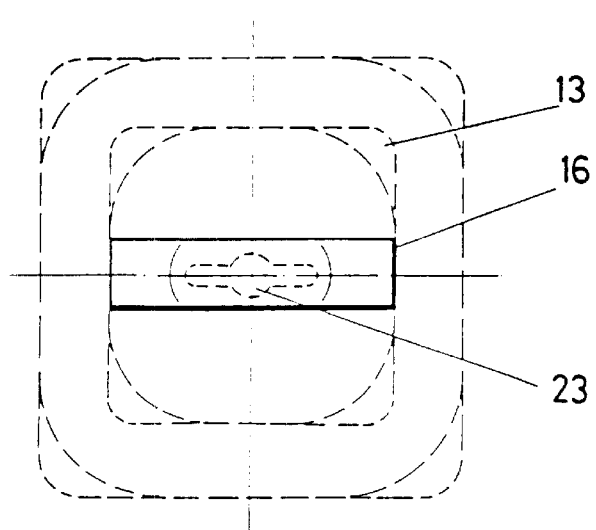
FIG.-3

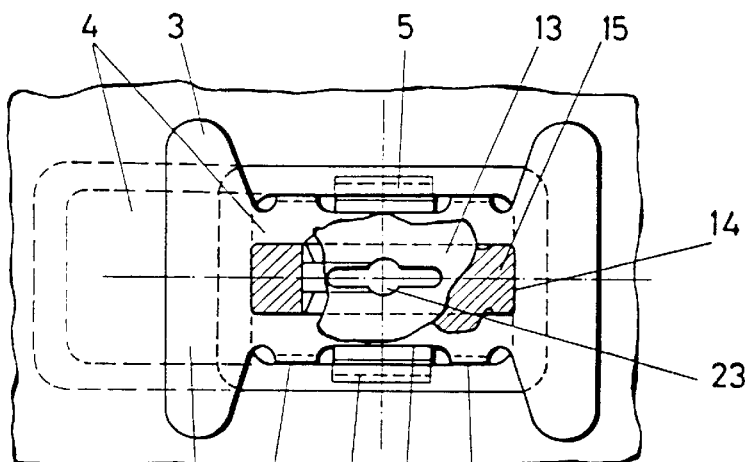
FIG.-4
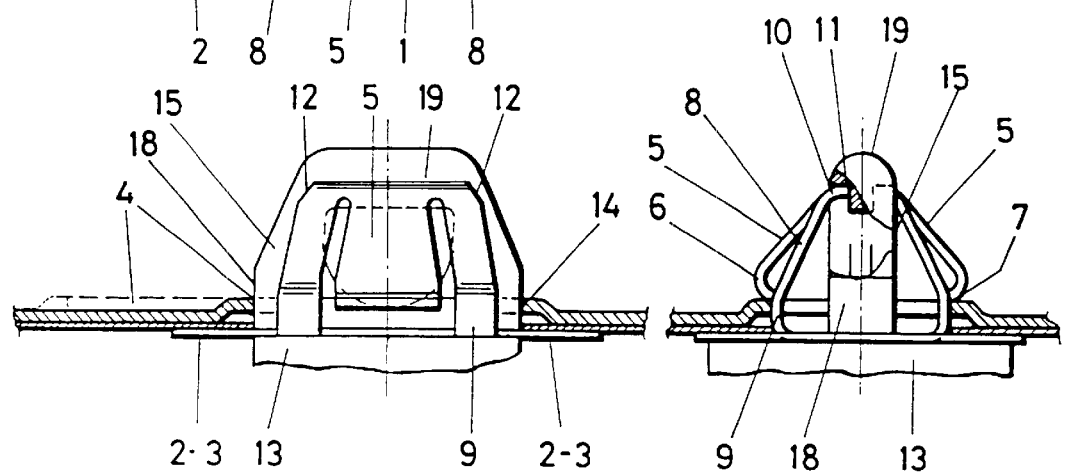
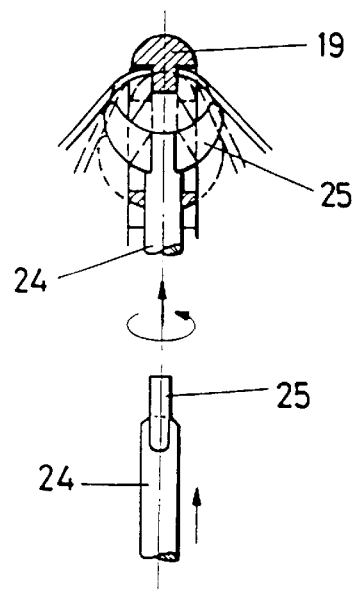
FIG.-5

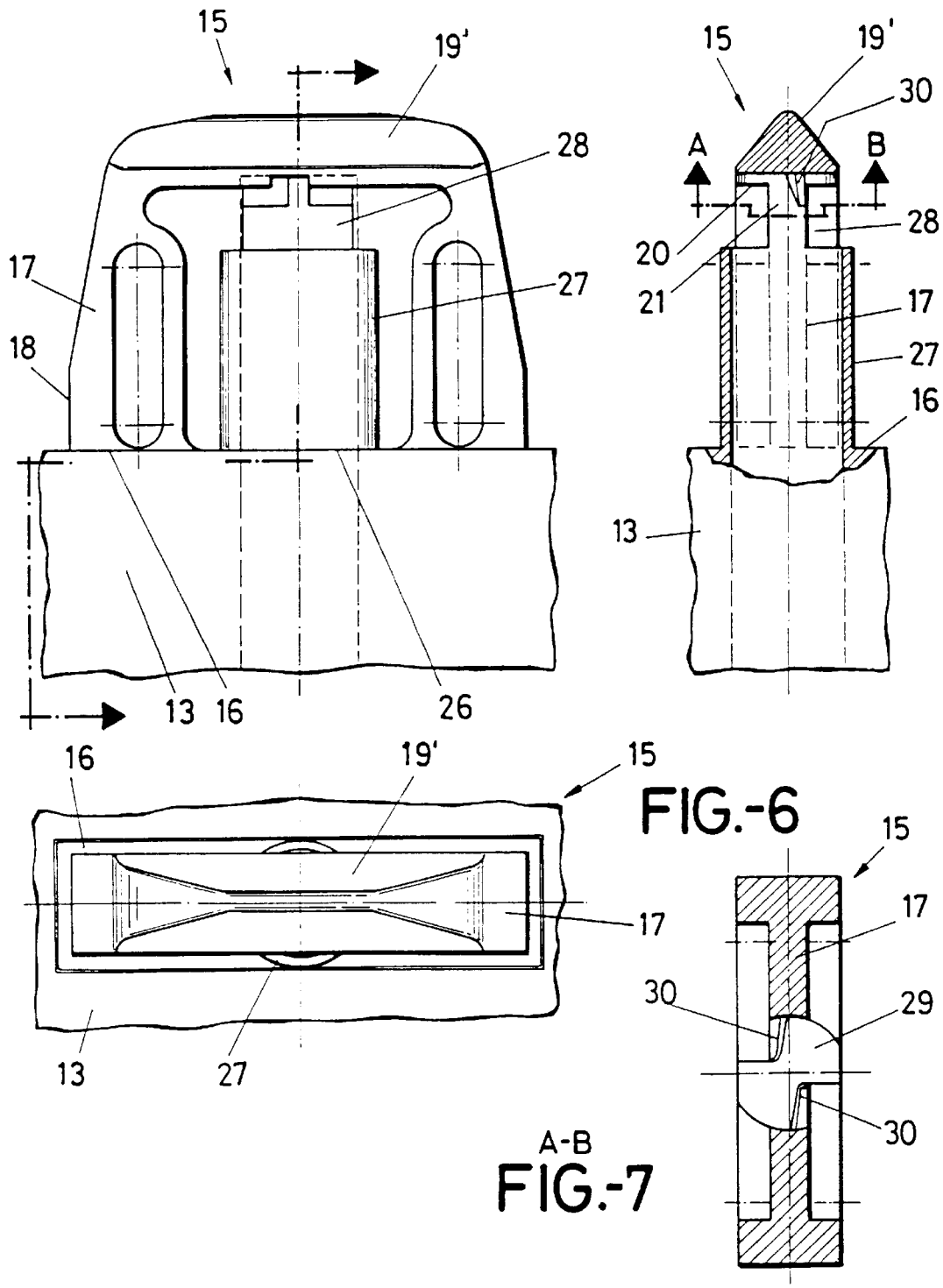

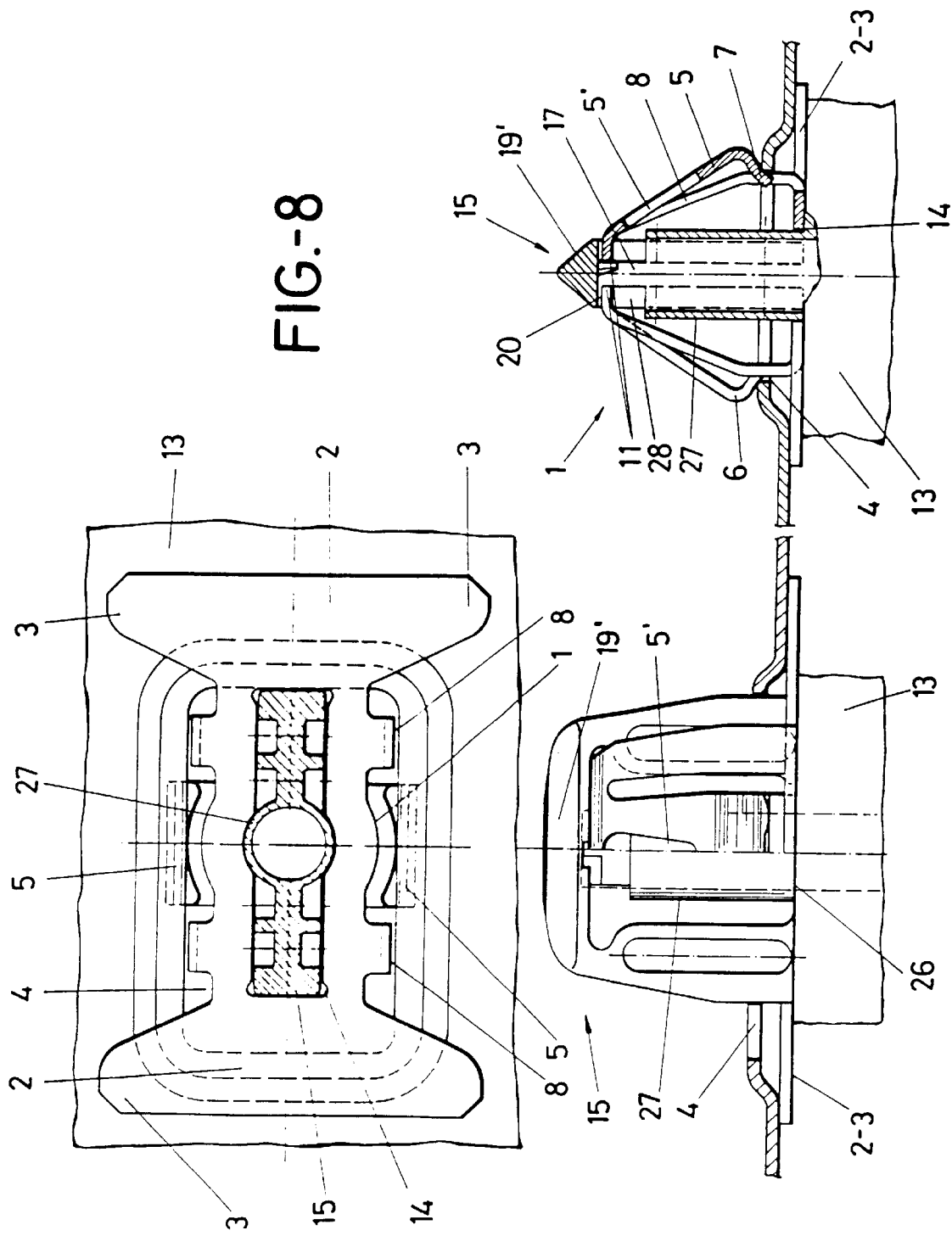

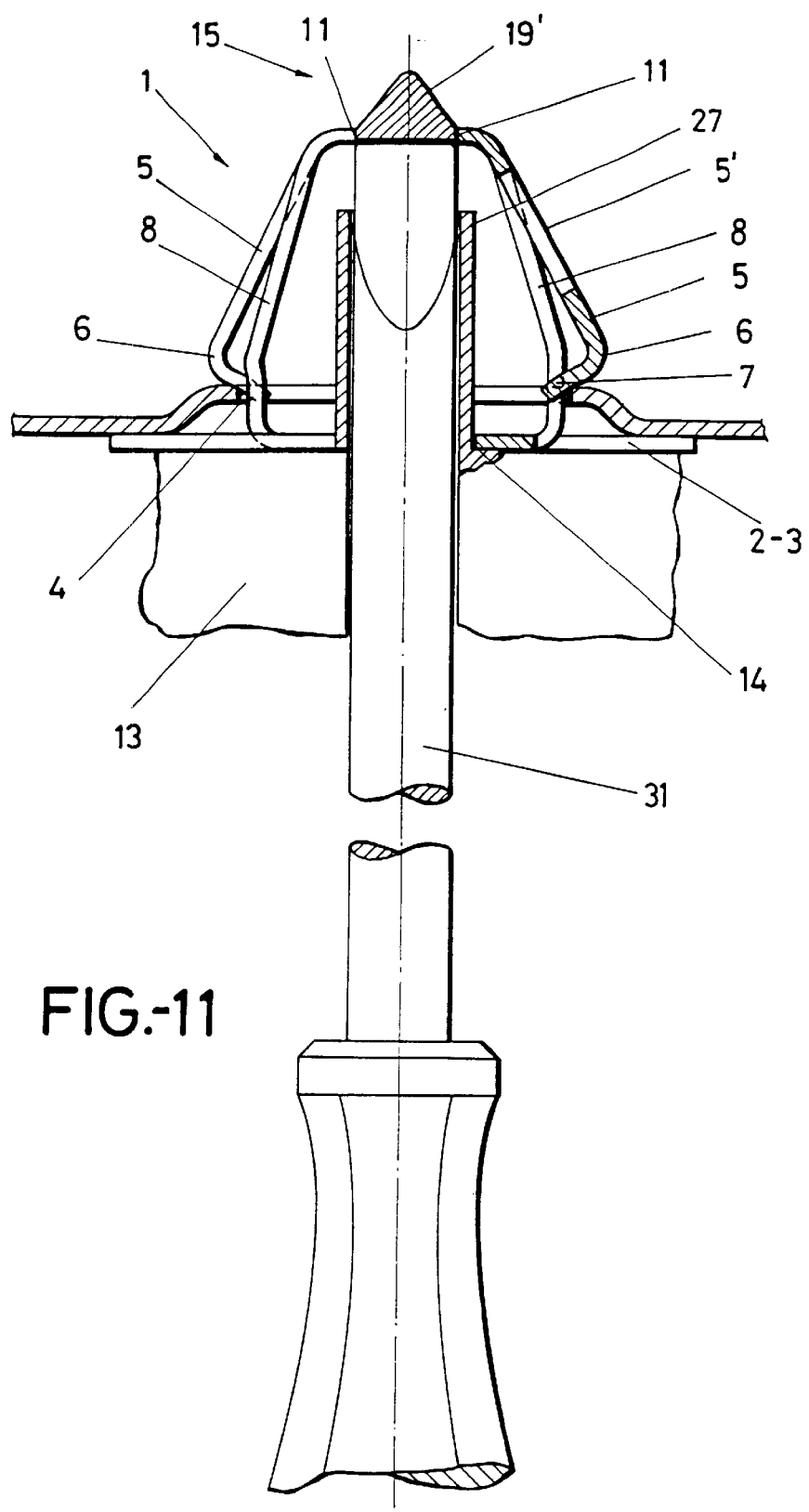

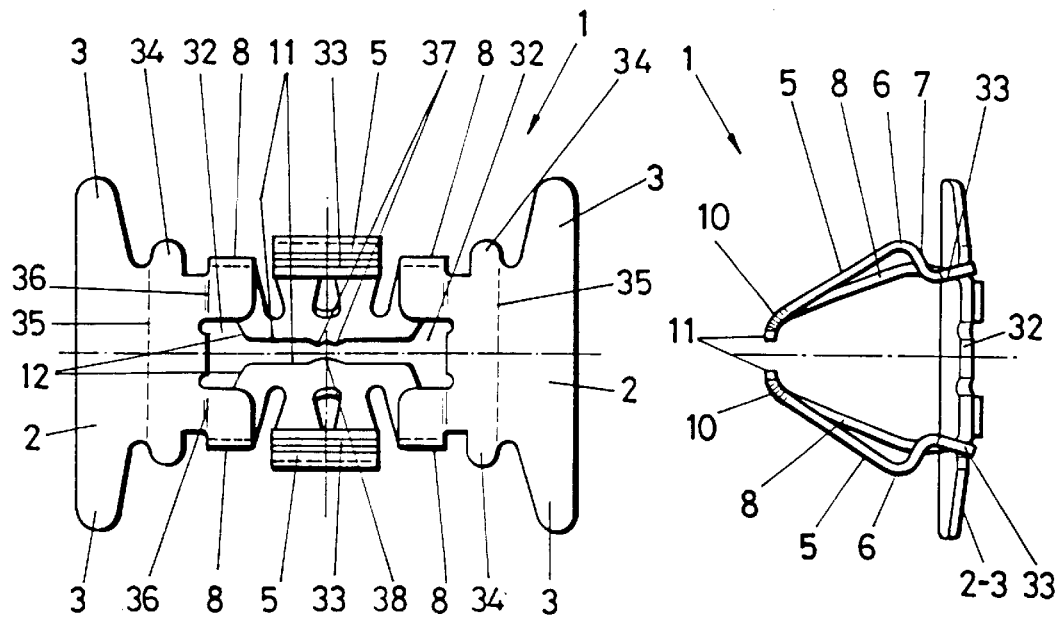
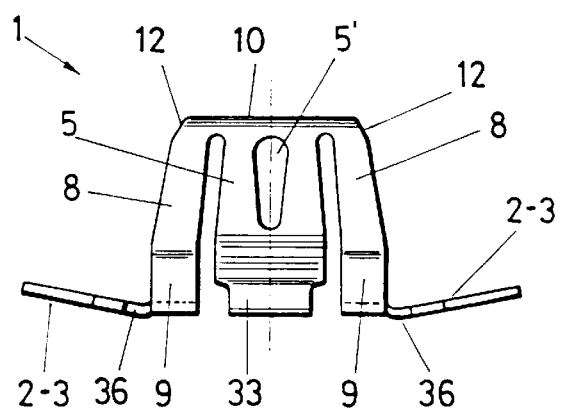
FIG.12

SYSTEM FOR FIXING ACCESSORIES TO PANELS AND/OR SELF-CARRIER ELEMENTS FOR THE INTERNAL LINING VEHICLES

OBJECT OF THE INVENTION

The invention relates to a fixing system between a metal clip and an accessory or mechanism in order to integrate the same in ceilings, self-supporting panels or other elements lining the interior of motor vehicles, such fixing being assisted by a plastic material peg that is solidly attached to the respective mechanism or accessory to stand as the means for connection, by insertion clipping, to the actual metal clip, defining an integral assembly that is to be mounted on the relevant part of the vehicle bodywork.

The object of the invention is for fixing to take place directly, simply and efficiently, without having to use such additional elements as the classic screws required by conventional fixing systems. The object of the invention is also to enable the accessory to be easily dismounted or detached from the integral assembly it forms part of, which dismounting may be effected using a conventional implement and without any problems whatsoever.

BACKGROUND OF THE INVENTION

In mounting self-supporting elements or panels to which certain vehicle accessories or mechanisms are fixed, such as grips in the cabin interior, armrests, rear-view mirror, etc., and in order thereon to mount the entire assembly on and have the same held to the actual vehicle bodywork, clips are used which are on the one hand the means fixing the accessory to the respective self-supporting panel and on the other the means fixing said assembly to the vehicle bodywork.

In particular, Spanish Patent no. 9401338 and Certificate of Addition thereto no. 9501623 disclose a clip for such mounting and fixing purposes, the clip being a metal clip consisting of a steel strip having a flat base and two end expansions, and moreover having two symmetrically folded side projections, which projections are each fitted with flexing flaps diverging outwards.

The clip disclosed in these documents is peculiar in a number of ways, namely for instance because the end expansions of the base define four corners which allow the clip base as such to be full stably supported, even if the window provided in the vehicle bodywork for it to be fitted is longer than the minimum required, the extensions or expansions being provided with a slightly inclined plane for an easier locking and fixing of the clip in and to the relevant window.

Furthermore, said base has two holes, provided with a straight section close to the side or end edges of the clip base, which holes help properly insert the respective positioning guides purposely provided on the accessories to be fixed, moreover making it easier to insert in and subsequently center the clip proper on the vehicle bodywork window, upon the clip sliding along the inclined and vertical planes which the bases supporting the accessories are purposely provided with.

The subject clip is also peculiar in that the side projections are bent into a rounded shape at their top and extend into vertical sections which come to lie side by side and projecting perpendicularly relative to the base, provided to endure the stress conveyed from said base of the clip when the accessory is arranged thereon.

This type of clip has a number of drawbacks or disadvantages, such as the fact that screws and washers are required to fix the clip to the accessory, which results on the one hand in a waste of time due to the screwing operation, and on the other the disadvantage that arises at times when effecting such screwing operation, due to the structural characteristics of the accessory as such and the other component parts involved in the locking or fixing operation.

DESCRIPTION OF THE INVENTION

The fixing system disclosed herein has been devised to solve the above-mentioned drawbacks and moreover provide a number of innovations which result in substantial advantages and new benefits.

More specifically, the fixing system subject of the invention uses the metal clip and a plastic material peg as an integral element of the accessory that is to be fixed, or else an element independent from the accessory, to which it is suitably attached in order thereafter to be fixed to the clip as such, defining an integral assembly ready to be mounted on the respective window purposely provided in the vehicle bodywork.

Connection between the accessory and the clip by means of the plastic material peg can be made directly simply by pressing, using the thumbs, or by means of a purposely made implement, if this is to take place automatically.

The plastic material peg eliminates the classic screw and washer used in conventional systems. Clearly, the new fixing system will eliminate any difficulty whatsoever in regard to screwing to fix the peg and clip and accessory, for there is no screw whatsoever in this case, hence the savings in both time and materials, etc.

Furthermore, because of the special peg configuration, the use of the peg as the interconnection element or to fix the clip and the accessory to each other results in the peg lying on top edges or ridges of the clip flaps or tabs through which support is provided on the edge of the window purposely made in the bodywork, this new arrangement allowing for a substantial rigidity and making the assembly far stronger, indeed as regards "feeling" towards heavy loads, unlike conventional fixing systems, in which a screw is fixed on the actual clip base, which base is the weakest element in the clip because of its configuration, and is however the portion or element undergoing a greater pull/bending stress, thereby conveying a "feeling" of scarce rigidity to strong pulling forces.

As for the clip structure, not only does it have the base and its end and side expansions, as well as flexing flaps and the relevant sides, as with conventional clips, but it is particular in that the side flaps of said clip, are not folded on themselves after their rounded top bend to define vertical side by side expansions, but are rather interrupted after the rounded bend to define a spacing between edges for the relevant connection to the respective peg, being also particular in that the base of said clip has a large rectangular window to allow said peg through.

For its part, said peg consists of a body with a lower rectangular base and a small double slot keyway coaxial with the peg axis, a narrow part with a large hole projecting from such base and ending at the top in a rounded shape resulting in a T-shaped cross-section the cross or top leg of which is entirely rounded, as noted before, i.e. hemispherical or the like, whereas a stepping is defined beneath same on either side precisely for the top edges of the sides of the actual metal clip to be positioned.

Now, therefore, if it should be necessary to dismount any accessory or all the accessories fitted on the self-supporting panel or in other applications, a simple manual implement in the form of a two-part wrench will be inserted through the small double slot keyway coaxial with the peg axis, and upon pushing and turning it over 90°, the top edges of the sides of the actual clip will be appropriately drawn away from the stepping or supporting side portion on the peg where they are inserted, being released therefrom and hence from the fixed position, said clip being in principle fixed to the bodywork window from which it may be readily removed by acting on its tabs with a simple narrow blade screwdriver, to restore it once again by inserting it in the relevant peg of the removed accessory, or leaving it in position and inserting in it again the peg of the dismounted or replaced accessory, whereupon it will be perfectly fixed without any further operations being required.

Because the top edges of the sides of the clip are not in contact with each other, but are rather supported on the sides of the peg body, all squeaking which might result upon their rubbing against each other when the accessory is manipulated or due to the actual vibration of the bodywork or movement of the vehicle will be avoided.

The subject fixing and locking system results in the elements being efficiently clipped, enhancing and further securing their insertion in elongate bodywork windows, their rigidity remaining unchanged, which is an important condition when the dispersion of tolerances with respect to the reference points established as a result of the welding processes of the car bodywork elements must be offset.

In a different embodiment, the peg has characteristics that allow the clip and the peg to be dismounted or detached from one another by means of a conventional implement, such as a screwdriver, to which end the hole through which the tool or implement proper is inserted is provided to extend into a tubular extension that reaches the top end of the actual peg, a bore being defined between said edge and the end of the tubular extension, to allow the implement through in order that it may drive the clip, simply making a sharp 90° turn.

The top edge of the bore through which the expander implement can operate has a central cylindrical recess with two abutments, the latter delimiting the maximum rotation of the implement in order to draw away the edges of the flexing flaps and thereby release the clip from the peg, for a quarter of a turn in turning the implement or screwdriver allows such expansion or drawing of the flexing flaps of the clip and thus its disconnection from the peg.

The tubular extension provided as an improvement in the embodiment described for the inventive peg allows the implement or screwdriver to be inserted duly guided in the right direction toward the central cylindrical recess with which the top edge of the window through which the implement can act is purposely provided.

For its part, the clip is particular in that its flexing flaps can be provided with lightening windows, thereby improving flexibility and making it easier to insert the clip in the bodywork receiving windows.

In another embodiment, both the clip and the peg include a number of changes derived from the same number of improvements that result in new benefits.

Specifically, one of the advantages of this third embodiment lies in that the window provided on the bottom base of the clip to allow the peg through is eliminated centrally, resulting in the same being reduced to two facing incuts on its base, which will now allow a development to be had with sufficient material for the side flexing flaps to be longer, which greater length will be used to obtain expansions therein, which are divergent and on which it is sufficient to act using pincers or pliers once the peg has been removed to detach the clip from its anchorage.

This improvement moreover means that the indents purposely provided in the side flaps for them to be fixed to or anchored in the edges of the window purposely provided in the vehicle bodywork will lie in a lower relative position, which allows the inlaying which previously had to be made around the bodywork anchorage window to offset the height or distance between those indents and the top base of the clip to be eliminated. Clearly, the new conception or improvement referred to allows said distance to be controlled in the clip manufacturing process, as the thickness of the shell where the relevant window is to be made may require to be applied, Another improvement lies in that the clip base is provided with small flaps, as an integral part of the end and side extensions, which flaps allow the accessory or mechanism to be held, allowing part of such end extensions to be eliminated, where this is deemed convenient, which operation would take place during the manufacturing process, which would result in the clip base being considerably reduced, which might be interesting for certain applications in which the condition that the clip have the end and side extensions may not be required.

Furthermore, another improvement provided lies in that the end extensions of the clip base are provided with small deformations or depressions which allow clipping to be secured after moving the clip itself in the insertion action in the relevant window.

Another improvement lies in that the top facing edges of the clip sides have small central protuberances and a small arch between them, in order that upon being opened or moved by a screwdriver action, in the operation to release the peg, the arch may lie in a stable position and make the operation easier, allowing the screwdriver to be turned to the right or to the left, unlike former versions in which the screwdriver could only be turned in one direction, moreover allowing the abutments required in the inner conformation of the peg in the preceding version to be eliminated.

Another improvement of the invention lies in providing the peg with ribs or reinforcements which, in addition to providing the peg with greater stability, serve to guide the clip and manage to center the same on the window, enabling support on all four sides, rather than on the two broadsides as before.

Another improvement lies in that the peg proper is provided with depressions which allow the clip deformations to be housed during the overtravel required for clipping between the latter, the peg proper and insertion thereof in the bodywork window.

It is also an improvement of the invention to provide the peg with other depressions allowing movement of the divergent clip extensions whilst both parts are being coupled, and their insertion in the window.

In a different embodiment, the clip can be a double clip, i.e. made up of two like elements connected by a pair of intermediate sectors or arches, albeit provided collaterally with the two clips, which sectors or arches are obtained as an integral part of the actual development of said double clip.

Clearly, the peg to be used with this clip can also be a double peg and will comprise respective identical bodies, provided on a single base and with a passage that will come to lie facing the passage defined between the two clips and bridges connecting the same, in order to allow the passage of a supporting turret, namely for instance the base of a sunshade. The facing parts of the two pegs will have pairs of ledges on and against which the respective lower sectors of the flexing flaps for the two clips will be supported and abut, in order to achieve a suitable anchorage and attachment therebetween.

DESCRIPTION OF THE DRAWINGS

In order to provide a fuller description and contribute to an easier understanding of the characteristics of the invention, a set of drawings is attached to the present specification as an integral part thereof which, while purely illustrative and not fully comprehensive, shows the following:

FIG. 3. Also includes the three views of the preceding figure, with the peg solidly attached to an accessory.

FIG. 4. Shows how the clip-peg-accessory assembly made in accordance with the system of the invention are fixed to each other.

FIG. 5. Is an elevation close-view of the implement showing how it works to release the metal clip from the peg, by a simple turning movement and axial push.

FIG. 6. Includes two main (elevation and plan) views, and a cross-sectional elevation of the peg forming part of the fixing system subject of the invention, in an improved different embodiment thereof.

FIG. 7. Is a cross-sectional view along line A–B of the cross-sectional elevation view of FIG. 2, revealing the upper configuration of the peg and the recess with the limiting abutments for the rotation of the expander implement.

FIG. 8. Includes three views showing how the clip-peg-accessory assembly is mounted, with a portion of the parts cut away, all in accordance with the improved embodiment of the peg and indeed of the actual clip.

FIG. 11. Is a view similar to that of the foregoing figure, albeit with the implement now actuated, i.e. turned 90° clockwise. This figure shows the expansion or drawing of the edges of the flexing flaps that are released from the peg.

FIG. 12. Includes three plan, side elevation and front elevation views of the third improved embodiment of the clip.

PREFERRED EMBODIMENT OF THE INVENTION

Figure 1:
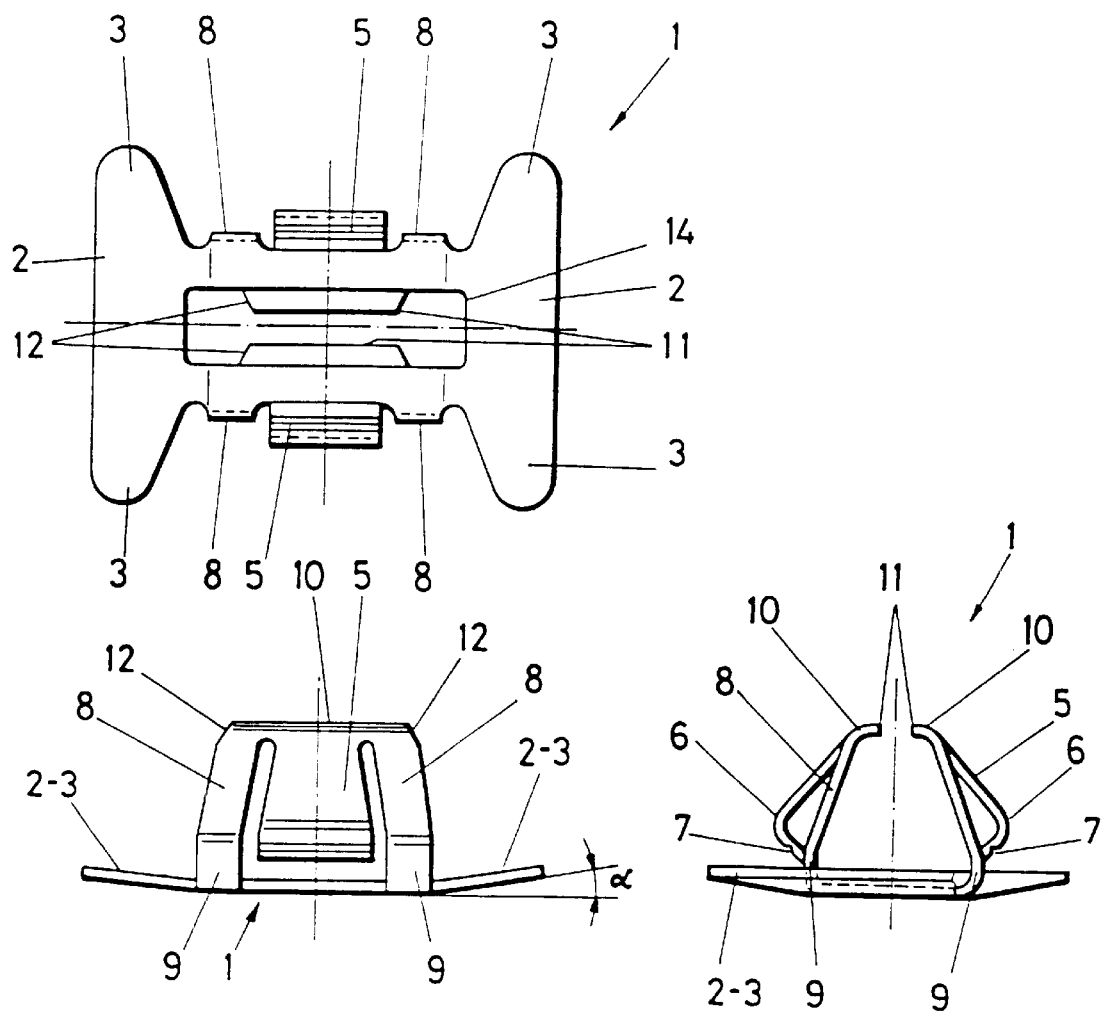
FIG. 1. Includes the three main (bottom plan, elevation and side) views of the clip forming part of the fixing system subject of the invention.

With reference to FIGS. 1 to 5, the fixing system subject of the invention first of all comprises a metal clip (1) provided with a flat base leading into end extensions (2) having side expansions (3), the latter being slightly inclined upwards, at an angle a to the horizontal plane of the base. The purpose of these side expansions (3) is for the clip as a whole to be full stably supported and for the clip (1) to be perfectly locked and fixed to the respective window (4) purposely provided in the vehicle bodywork, even if the length of this window is greater than the acceptable minimum.

This clip (1) is provided with trapezium-shaped flexing flaps (5) on its sides, diverging downwards from the top until they reach a point at which they are provided with a rounded bend (6) and then continue into inclined sections projecting downwards and inwards, said sections being externally provided with a longitudinal indent (7) the purpose of which is to avoid the actual clip (1) from sliding on the relevant edge of the window (4), thereby ensuring that it is locked and very substantially enhancing the resistance to the stress derived from such an action.

The flexing flaps (5) aforesaid are made on the sides of the actual clip, defining in the latter sectors (8) with an almost vertical lower section (9), whereas the actual sectors (8) converge upwards until they reach a point at which they are provided with a rounded bend defining a top section (10) in each sector (8), ending in facing edges (11). In other words, the rounded sections (10) after the top bend lie with their edges facing and with a spacing, which sections run parallel to the actual base. The sectors (8) are provided at their top outer end edges with respective tapers (12) assisting in the clip as a whole being inserted through the relevant window (4).

For their part, since they are trapezium-shaped, the flexing flaps (5) allow a better balance of ratios to be achieved on the edges or top area thereof, and therefore with the inclination of such flaps and of the sectors (8) proper, a sort of top frustum-of-the-pyramid is formed that makes it easier for the clip to face and be inserted in the relevant window (4). The vertical lower section (9) of the sectors (8) provides for guidance and centring of the clip within the window (4), thereby ensuring a relative positioning of the relevant accessory (13) that is to be fixed, even if the latter is simple or unitary, since turning is thereby avoided.

The actual clip (1) is provided with a large broad rectangular window (14) centred longitudinally on its base, through which the relevant peg (15) will be inserted as a fixing element between the actual clip (1) and the accessory (13).

Figure 2:
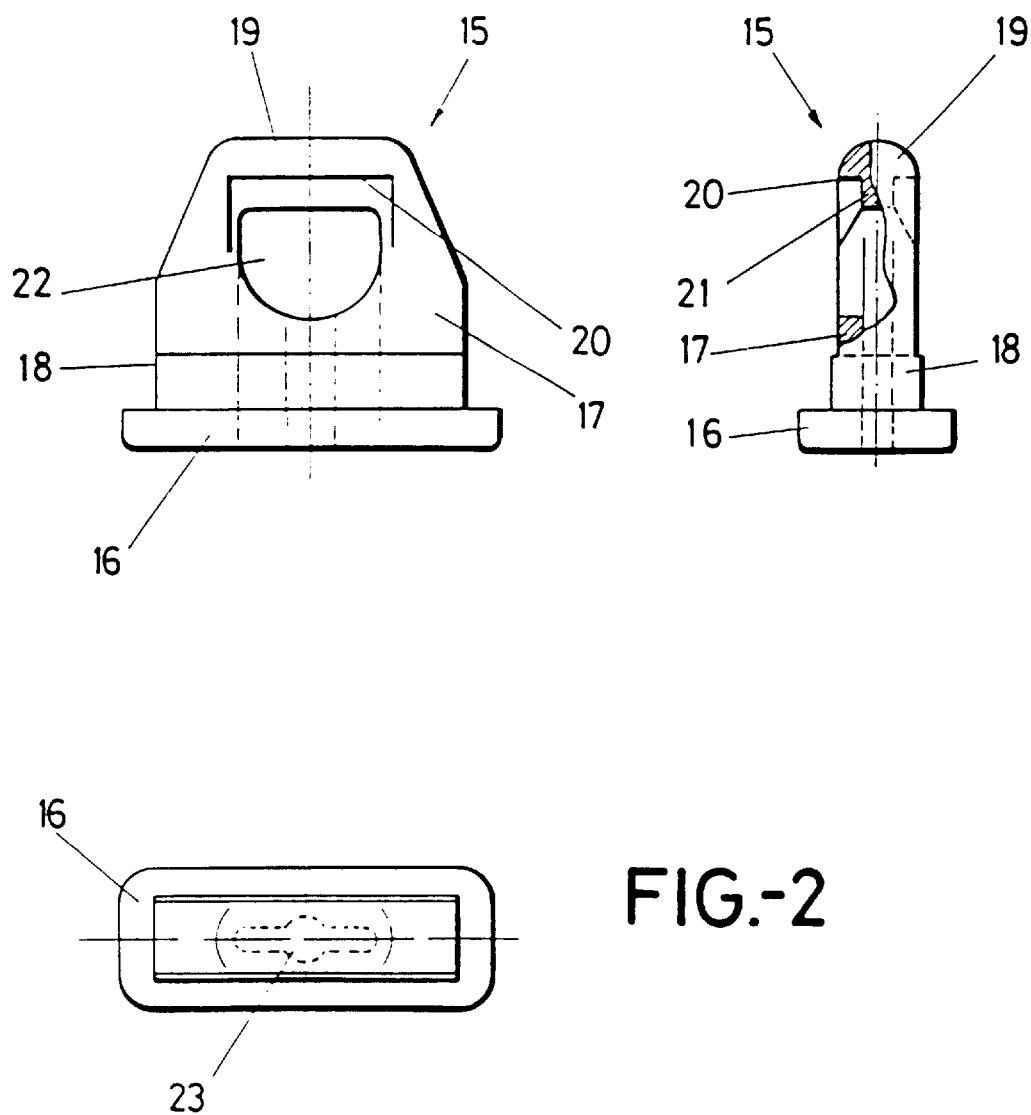
FIG. 2. Also includes the three main (side, elevation with cut-away portion and plan) views of the peg included in the fixing system subject of the invention.

Said clip shown in FIG. 2 consists of a body with a rectangular base (16) from which a part (17), that is likewise rectangular in shape, albeit rather smaller, projects vertically upwards, with a lower section (18) having vertical rectangular sides, from which the part (17) projects forming a T-shaped cross-section with a top convexly curved part (19), which could be said to have a semicircular profile, beneath which a stepping (20) is defined at a right angle to the respective core (21) of the T-shaped configuration of said top portion of the peg (15) proper. The sides of said peg (16) are trapezium-shaped with the exception of a lower section which is straight, before reaching the lower section (18), said peg (15) being provided with a large window (22) the purpose of which shall be explained hereinafter.

The trapezium sides of said peg (15) converge upwards, i.e. in an inclined manner, until they are connected at the top by said rounded or semicircular configuration (19). Furthermore, said peg (15) has a double slot (23) or keyway coaxial with its axis.

In accordance with these characteristics, the peg (15) is inserted through its top semicircular portion (19) through the window (14) on the base of the actual clip (1), flexing the sectors (8), until the facing edges (11) of these sectors (8) lie beneath the step (20) on the peg, supported on the sides of the rib or core (21) thereof, thereby avoiding potential squeaking due to vibration of the bodywork proper or strange manipulations of the mechanisms, for they all make up a solid assembly which provide for a very strong fixing of the accessory (13).

Clearly, along with the rounded surface or top semicircular edge (19) of the peg (15), the tapers (12) of the sectors (8) make it easier to insert the peg through the actual window (14), this insertion and final anchorage or fixing being moreover assisted by the trapezium shape and inclined edges of the sides of the actual peg (15) which, if an accessory (13) must be dismounted using a special implement (24) as shown in FIG. 5, with an upper crescent-shaped head (25), can be very easily made, for it will be sufficient to insert such an implement (24) with its head (25) through the double slot (23) thereafter to turn the former and move it by pushing in an axial direction, the peg (15) window (22) actually allowing the head (25) of the actual implement (24) to be turned, thereby allowing the facing edges (11) of the clip (1) to be detached or released from the actual peg (15).

In an alternative embodiment, or in other words improvements both in the clip (1) and the peg (15), as shown in FIGS. 6 to 11, the flexing flaps (5) are shown provided with lightening windows (5'), which improve the flexibility of these flexing flaps (5) and make the clip (1) easier to insert in the respective windows.

For its part, the peg (15) made with the improvements shown in FIGS. 6, 7, 8, 10 and 11, is particular in that the top has a triangular profile (19') and is provided on the bottom with a bore (26) from which a tubular extension (27) projects almost up to the top edge of the peg, a window being defined between said edge and the ending of the tubular extension (27), which top edge is provided with a central cylindrical recess (29) and a pair of abutments (30) the purpose of which shall be described hereinafter.

In accordance with these characteristics, the peg (15) is inserted, through its triangular-shaped top (19'), in the window (14) on the base of the clip (1), causing the sectors (8) to flex until the facing edges (11) of said sectors, or in other words the flexing flaps (5), lie beneath the step (20) of the peg (15), supported on the sides of the rib or core (21) thereof, with the above-mentioned benefits and advantages.

Figure 10:
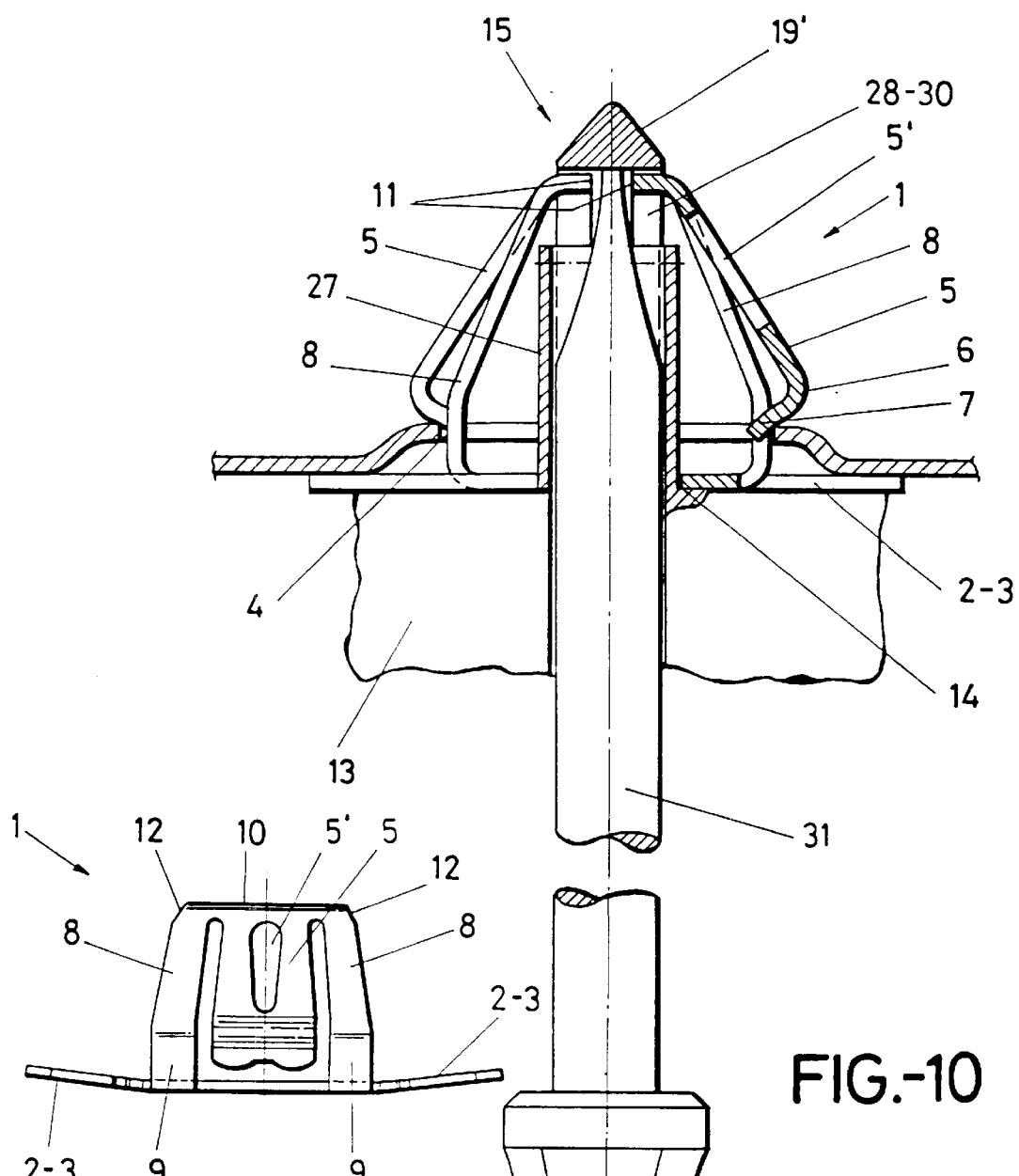
FIG. 10. Is a sectional view showing how to operate an expander implement, the implement being a screwdriver in this case, to draw away the flexing flaps and detach the clip from the peg. The implement can in this case be seen in the position in which it must be axially inserted without expansion being commenced.
Figure 9:
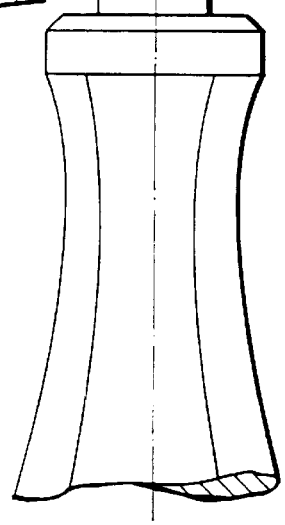
FIG. 9. Is an elevation view of the clip with the windows in its flexing flaps, in accordance with an improved embodiment thereof.
Figure 13:
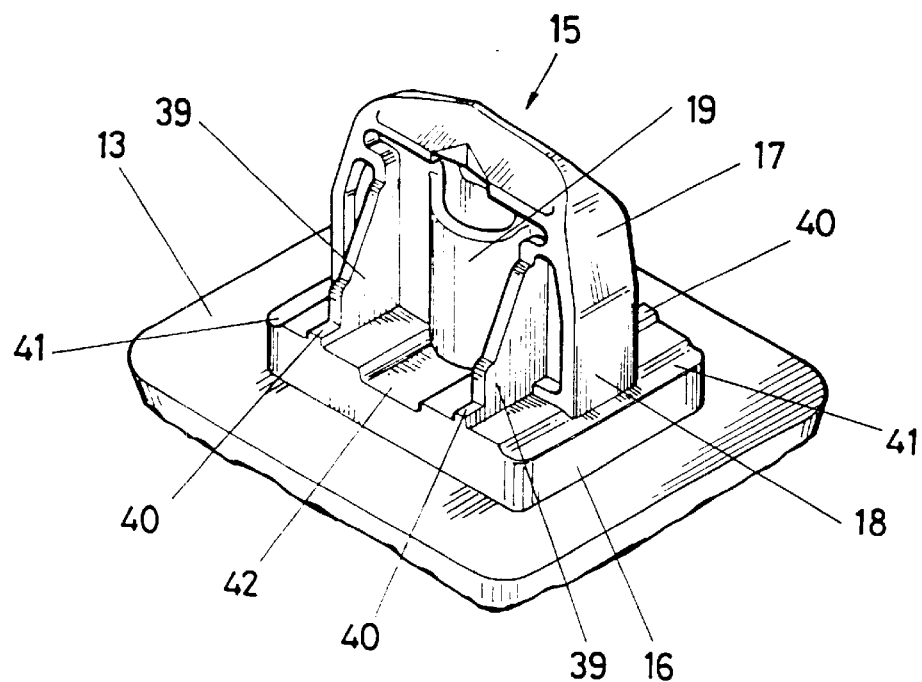
FIG. 13. Is a perspective view of the improved peg according to the third embodiment, which peg is solidly attached to the relevant accessory.
Figure 14:
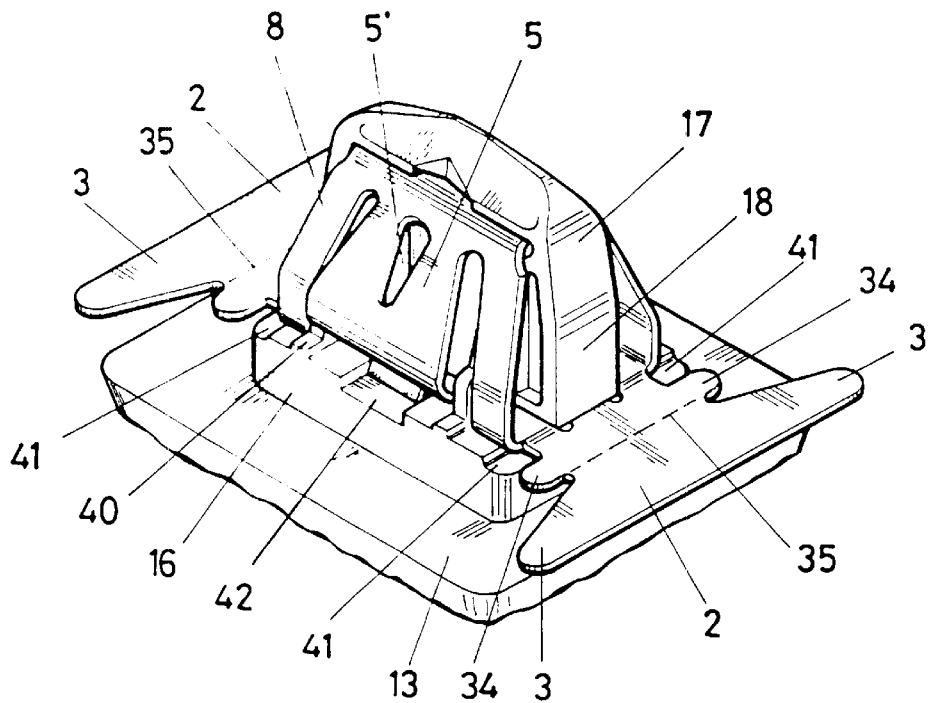
FIG. 14. Is a perspective view of the coupling between the peg and the clip shown in the preceding two figures, with the accessory solidly attached to the respective peg.
Figure 15:
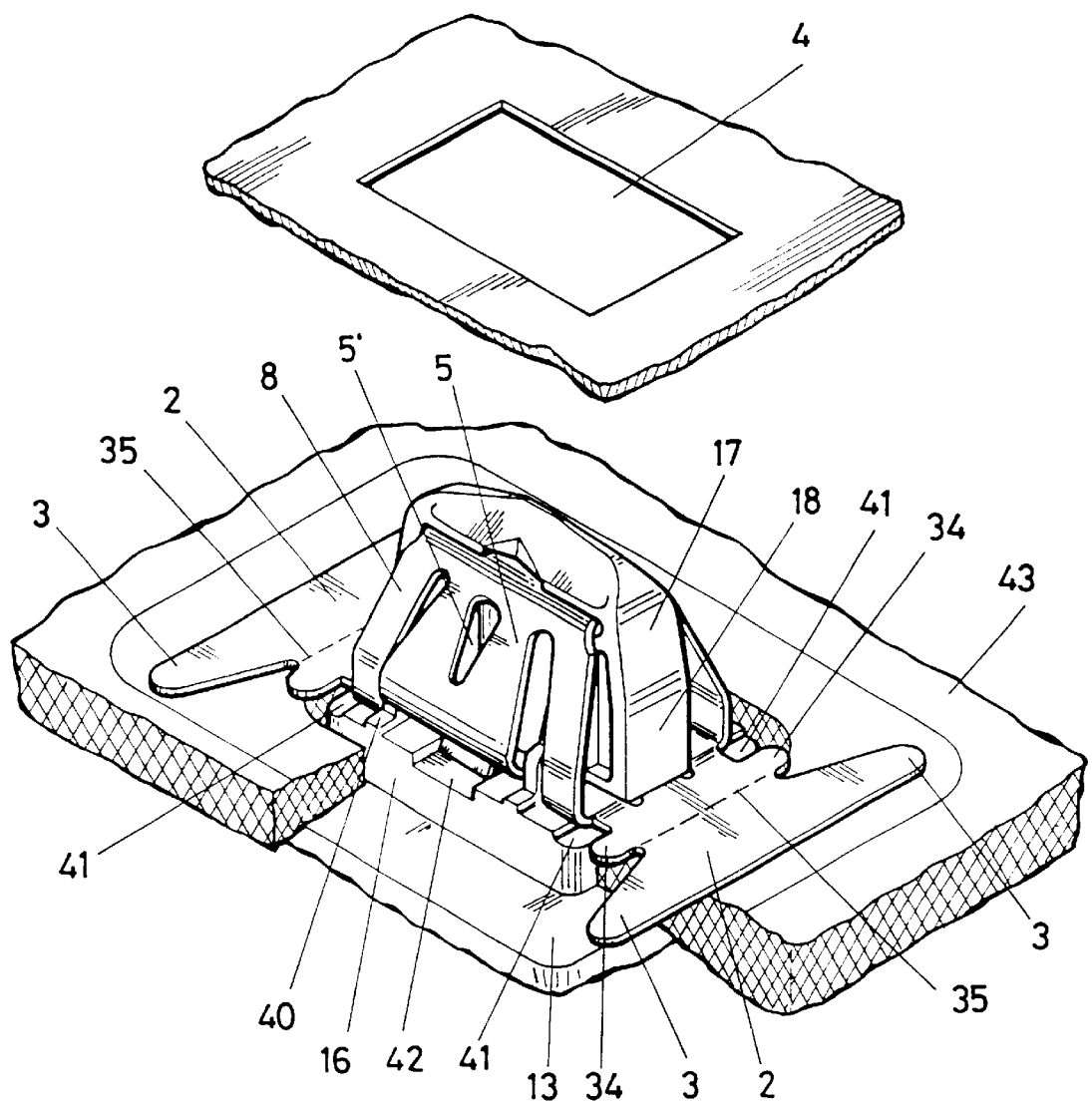
FIG. 15. Is the assembly represented in the preceding figure, passing through the respective self-supporting element, with its bottom face holding the accessory solidly attached to the assembly comprising the peg and the clip, the foregoing ready to be fixed onto the respective window purposely provided in the vehicle bodywork, part of the latter being shown in an exploded view.

The new characteristics of the peg (15) allow the assembly to be dismounted easily using a conventional implement (31), such as a screwdriver, which is inserted in and guided through the tubular expansion (27), reaching the central cylindrical recess (29) provided on the top edge of the window (28), and therefore by inserting said implement (31) as shown in FIG. 10, once the position shown is reached, it is turned clockwise one-quarter of a turn, such turn being limited precisely by the abutments (30), which turn draws away the edges (11) of the clip sides, thereby for the clip to be detached or released from the peg and hence for the assembly to be dismounted.

In the alternative embodiment shown in FIGS. 12 to 15, it may be seen that the clip (1) has no central window, the same being reduced to a pair of facing incuts (32), which allows a development to be had with sufficient material in order for the flexing flaps (5) to be larger, both in length and width, and consequently be able to provide the latter with expansions (33), facing and lying at a suitable divergent angle to each other, in order that whenever the clip (1) has to be removed, it will be sufficient, once the peg (15) has been removed, to draw these expansions (33) towards each other using pincers or pliers in order to full easily release the clip.

Said greater development of the flexible or flexing flaps (5) allows the indents (7) for fixing to the edges of the window (4) to lie at a lesser height, in their relative position, thereby to be able to eliminate the inlaying which had to be made around the bodywork window (4) to anchor the assembly, which inlaying was made to offset the height or distance between the indents (7) and the top base of the clip, whereas with this embodiment, due to the greater development of the flexing flaps (5), the distance can be controlled in the clip manufacturing process and said inlaying can be eliminated.

In addition to the novel characteristics of this third embodiment, the clip (1) has four small flaps (34) as an integral part of the flaps (3), which flaps (34) allow the extensions or expansions (3) to be cut along lines (35) shown in FIG. 12, for based on these flaps (34), the clip (1) is able to fulfill its purpose perfectly, in which case its base is reduced, which may be interesting for certain applications in which these end extensions or expansions (3) may not be necessary.

Another novelty of the embodiment being described lies in that the clip (1) is provided, at the start of the flaps (3–34), with certain conformations or deformations (36) which secure clipping during the insertion operation in the respective window, since overtravel may be had.

Another novelty of this alternative embodiment lies in that the facing edges (11) of the sectors (8) of the clip (1) are provided with pairs of small protuberances (37), facing each other, and provided with an arcuate notch (38), the foregoing in order to allow, during the opening operation using a suitable implement, that the latter's end be in a stable position, the opening operation being made easier by the edges (11). This characteristic avoids having to include the abutments limiting rotation of said opening implement in order to unlock the peg and the clip, thereby allowing said implement to turn both to the right and to the left.

As for the peg (15), in this third embodiment being described, its essential novelty lies in being provided with reinforcement ribs (39) which, in addition to providing it with greater stability, serve as a guide means for the clip (1), centring the same on the respective window, through the longer sides, and moreover achieving a support on all four sides, which provides a greater rigidity in mounting the actual peg.

The ribs (39) have extensions (40) at their base, the purpose of which is to provide the assembly with support and stability, upon being inserted in the bodywork window (4).

Furthermore, the base (16) of said peg (15) has depressions (41) at the sides, which allow the deformations (36) of the clip (1) flaps to be housed, making clipping on the window easier, and moreover has other intermediate depressions (42) which allow the expansions (33) of flaps (5) to be moved in the same operation.

Figure 16:
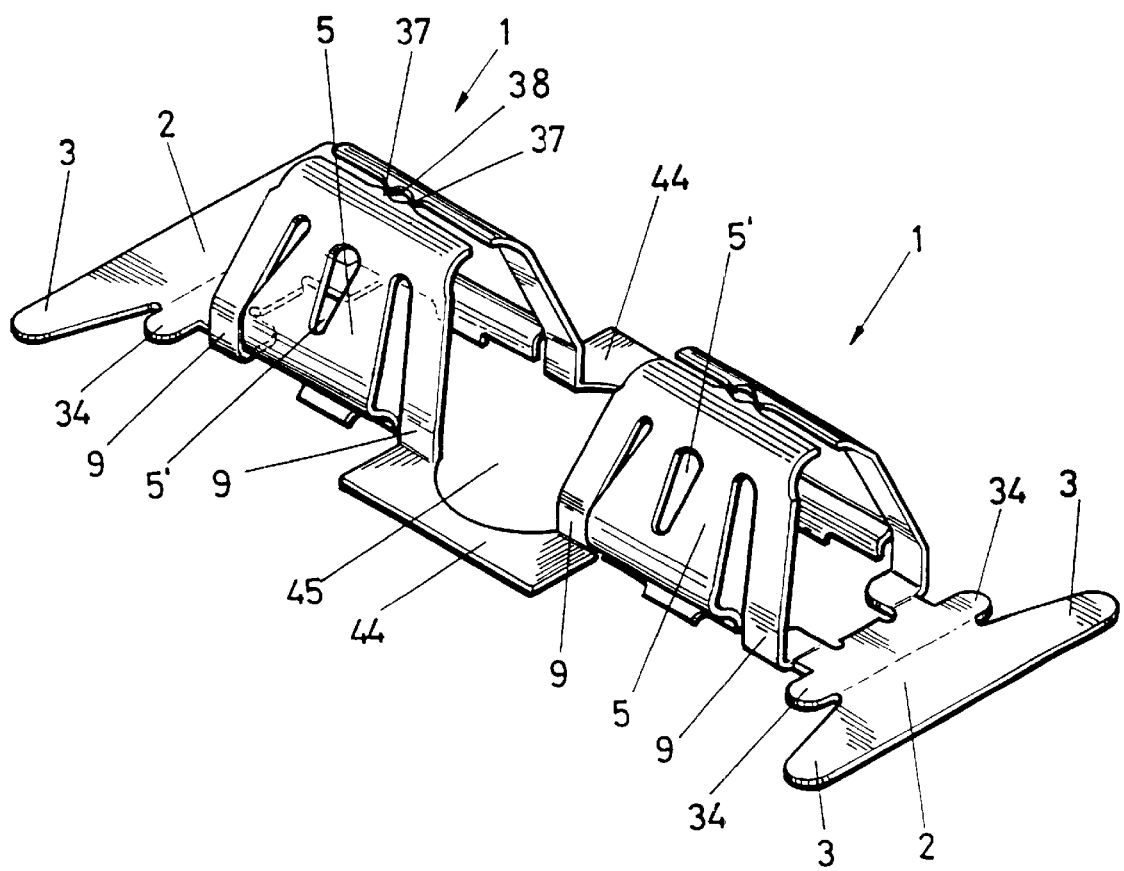
FIG. 16. Is a perspective of the embodiment in which the clip is a double clip, showing that it comprises two exactly like elements or units, connected by side or intermediate sectors therebetween.

In accordance with the above-mentioned characteristics, mounting takes place by inserting the peg (15) solidly attached to the accessory (13) through the window purposely provided in the relevant self-supporting element (43) shown in FIG. 16, the accessory (13) abutting against the lower base of said self-supporting element, the peg (15) passing through its window and thereafter being clipped onto the clip (1), which lies over the opposite face of said self-supporting element (43), thereby to form a peg-clip-accessory-self-supporting element assembly, suitable to be fixed to and anchored in the bodywork window (4).

Based upon said characteristics, a metal-plastic clipping system is obtained between the metal clip (1) and the plastic peg (15), which is particular in that due to the configuration characteristics of the peg, once the peg (15) has been detached or released, since the expansions (33) are compressed between each other, it is possible to fill easily remove said clip from its housing.

Similarly, due to the new size of the flexing flaps (5) of the clip (1), the indents supporting the same can be at such a distance from the base as to allow their being mounted on windows (4) without any inlaying.

Another advantage lies in that due to the arcuate notches (38) on the facing edges (11), which notches are provided between the facing protuberances (37), the implement can be kept in the opening position throughout the operation to detach the peg (15) from the clip (1).

It is also noteworthy that the flaps (34), which allow the end extensions (3) to be rendered independent through the lines (35) of the clip (1), allow the clip base to be reduced and hence to provide it with another application.

In another different embodiment, the clip is a double clip, as shown in FIG. 16, and may indeed be a triple clip, which double clip includes two identical elements or units (1) lying correlatively between each other and connected by a pair of side end outer arches or sectors (44), a passage (45) being defined between them. These two elements or clips (1) have the same characteristics as the clip (1) described in the preceding figures, and are arranged as shown in FIG. 16 correlatively with respect to each other, in a symmetrical arrangement, and therefore the side intermediate connecting sectors or arches (44) are obtained as an integral part of the actual development of said double clip (1).

Figure 17:
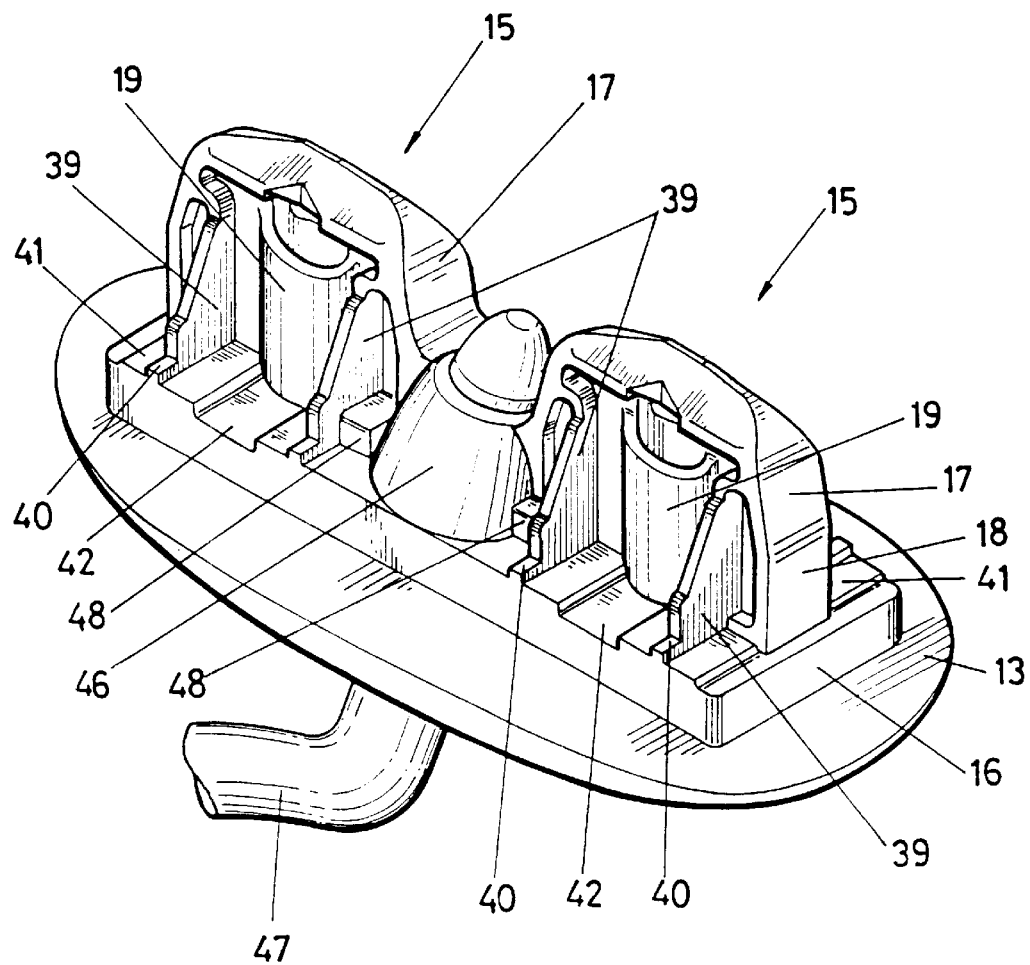
FIG. 17. Is the double peg which shall be used with the double clip represented in the preceding figure, which double peg is linked to the respective accessory carried by a support or anchoring base passing through said double peg body, although it will logically also pass through the opening defined between the two clips of FIG. 5.

The double peg (15) will be double as shown in FIG. 17, i.e. will have two identical units as described and referred to herein before, both emerging from the same base (16), with the same components as before, and a passage on said base (16) for a supporting turret (46) provided on the arm (47) of an accessory, namely for instance a sunshade or the like, which turret (46) will also pass through the opening or passage (45) defined between the two clips (1) of FIG. 16.

In addition to the above-mentioned characteristics, the peg (15) forming a single assembly as shown in FIG. 17 will have a pair of ledges (48) on each side, defining the same number of abutments to support the lower ends (9) of the flexing flaps (5), allowing the latter to provide the required effect.

Together with the double peg, said double clip makes up an assembly which may serve as an element for fixing special accessories, such as sunshades for instance.

What is claimed is:

1. A system for fixing accessories to self-supporting panels and/or elements lining the interior of vehicles, said system comprising a metal clip (1) to which an accessory (13) is fixed to be integrated in a self-supporting panel lining the interior of a motor vehicle, which clip (1) has a flat base with a rectangular outline including slightly inclined end extensions (2) and lateral side expansions (3) in order to be stably supported at a locking window (4), in said panel, said clip further comprising flexing flaps (5) provided on respective sides (8), forming respective sectors therein on either side of the flaps (5), which sides (8) converge upwards, a peg (15) for fixing the accessory (13) to the clip (1), said peg being insertable through a large elongate rectangular window (14) provided in the flat base of the clip (1), said side sectors (8) being bent at the top to define sections parallel to the said flat base, with facing edges (11) separated from each other, for anchorage with respective to the peg (15), said peg (15) having a base (18) and a T-shaped cross-sectional body, and a top with a triangular or rounded shape to define a triangular or semicircular profiled surface (19) beneath which a step (20) is formed in which the facing edges of the top parallel sections of the side sections (8) of the clip (1) are positioned when the peg is secured to the clip.

2. A system for fixing accessories to self-supporting panels and/or elements lining the interior of vehicles, as in claim 1, characterised in that the peg (15) has a base (18) and a T-shaped cross-sectional body, whereas its top ends in a triangular or rounded shape to define a triangular or semicircular profiled surface (19) beneath which a stepping (20) is formed in which the facing edges of the top parallel sections of the side sectors (8) of the very clip (1) come to be positioned.

3. A system for fixing accessories to self-supporting panels and/or elements lining the interior of vehicles, as in claim 1 which further comprises an implement (24) having a crescent-shaped drive head (25), which, upon being manipulated to be turned 90° and pushed upwards, after being inserted through a double (23) provided in the peg (15), allows the peg (15) to be released from the clip (1), by separating the facing edges (11) of the side sectors (8) of said clip (1) with respect to the step (20) and a rib (21) of a core (17) of the clip (15), which is provided with a large hole or window (22) to allow the head (25) of the implement (24) to turn.

4. A system for fixing accessories to self-supporting panels and/or elements lining the interior of vehicles, as in claim 3, wherein a top edge of the window (28) has a central cylindrical recess (29) and a pair of abutments (30) delimiting the maximum rotation of the implement (31), which rotation is one-quarter of a turn clockwise to allow the edges (11) of the flexing flaps on the sides (8) of the clip to be separated, thereby to release the clip from the peg.

5. A system for fixing accessories to self-supporting panels and/or elements lining the interior of vehicles, as in claim 3 wherein the flexing flaps (5) of the clip (1) are provided with lightening windows (5') improving their flexibility in order to make it easier to insert the clip (1) in the respective window provided in the vehicle bodywork.

6. A system for fixing accessories to self-supporting panels and/or elements lining the interior of vehicles, as in claim 1, wherein the fixing peg (15) is provided with a tubular extension (27) which constitutes a guiding means for implement (31) which, upon being inserted through the respective bottom window in said peg, allows the latter to be released from the clip (1) by separating the edges (11) pressed against the step (20) of said peg; a window (38) being defined between the edge or step (20) and the end of the tubular extension (27), through which the implement (3) can be operated.

7. A system for fixing accessories to self-supporting panels and/or elements lining the interior of vehicles, as in claim 1 wherein the window at the base of the clip (1) is provided reduced by side expansions (32) defining an elimination of material used to extend the size of the flexing flaps (5), which are provided with divergent expansions (33) making it easier to remove the clip (1) once it has been released from the respective peg (15).

8. A system for fixing accessories to self-supporting panels and/or elements lining the interior of vehicles, as in claim 7, wherein in that the expansions (33) diverge outwards, which allows them to be drawn towards each other once the peg (15) has been released from the clip (1).

9. A system for fixing accessories to self-supporting panels and/or elements lining the interior of vehicles, as in claim 7 wherein the sides of the clip (1) base include, before the end extensions (3), four flaps (34) which allow said end extensions (3) to be rendered independent by cutting, during the manufacturing process, along transverse lines (35), thereby reducing the size of the clip (1) base.

10. A system for fixing accessories to self-supporting panels and/or elements lining the interior of vehicles, as in claim 7 wherein small deformations (36) are provided before the flaps (34) with which to achieve a more secure clipping of the clip (1) to the peg (15) and insertion thereof in the window (4) due to overtravel.

11. A system for fixing accessories to self-supporting panels and/or elements lining the interior of vehicles, as in claim 7 wherein the facing edges (11) of the clip (1) are provided with a pair of protuberances (37) and between them with a sector shaped as a small arcuate notch (38) which, upon being opened or displaced by of an implement, in the operation to detach the peg (15), allows said implement to be kept in a stable position making the detachment or releasing operation easier, and further allowing the implement to be turned in both directions.

12. A system for fixing accessories to self-supporting panels and/or elements lining the interior of vehicles, as in claim 7 wherein the peg (15) has reinforcement ribs (39) which provide the peg with greater stability and rigidity, constituting a guiding means for the clip (1) upon being inserted through the window (4) of the vehicle bodywork, moreover defining a direct support of the peg (15) against the window, through all four sides of the peg.

13. A system for fixing accessories to self-supporting panels and/or elements lining the interior of vehicles, as in claim 12, wherein the reinforcement ribs (39) of the peg (15) are provided with expansions (40) which enhance the support and stability of the peg-clip assembly upon being inserted in the respective window (4) of the vehicle bodywork.

14. A system for fixing accessories to self-supporting panels and/or elements lining the interior of vehicles, as in claim 7, wherein the base (16) of the peg (15) has side end depressions (41) for location of the respective deformations (36) on the clip (1), said peg (15) moreover having been provided with central depressions (42) which allow the expansions (33) on the flexing flaps (5) of the clip (1) to be moved in the same clipping operation between the clip and the peg and the assembly to the bodywork (4') window (4).

15. A system for fixing accessories to self-supporting panels and/or elements lining the interior of vehicles, as in claim 1, wherein the clip (1) is a double clip and is defined by two identical units connected by means of side sectors or arches (44) provided between the units as an integral part a passage (45) being defined between the two clips (1) and the interconnecting sectors or arches (44), which allows the passage of a purposely turret (33) purposely provided between the double peg (15) with two identical units emerging from the same common base (16), for a support or turret (46) on an arm (47) of an conventional accessory.

16. A system for fixing accessories to self-supporting panels and/or elements lining the interior of vehicles, as in claim 15, wherein each of the two double peg units (15) are provided on their facing side faces with respective ledges (48) that define abutments for supporting the respective lower sections (9) of the flexing flaps (5).

* * * * *